(12) United States Patent
Yu et al.

(10) Patent No.: US 12,436,316 B2
(45) Date of Patent: Oct. 7, 2025

(54) EFFECTIVE NONLINEAR OPTICAL COEFFICIENT OPTIMIZATION METHOD FOR LANGASITE GROUP SOLID SOLUTION CRYSTALS

(71) Applicant: Shandong University, Jinan (CN)

(72) Inventors: Haohai Yu, Jinan (CN); Dazhi Lu, Jinan (CN); Yuzhou Wang, Jinan (CN); Huaijin Zhang, Jinan (CN); Jiyang Wang, Jinan (CN)

(73) Assignee: Shandong University, Jinan (CN)

( * ) Notice: Subject to any disclaimer, the term of this patent is extended or adjusted under 35 U.S.C. 154(b) by 441 days.

(21) Appl. No.: 17/953,362

(22) Filed: Sep. 27, 2022

(65) Prior Publication Data

US 2023/0015923 A1    Jan. 19, 2023

Related U.S. Application Data

(63) Continuation-in-part of application No. PCT/CN2022/114468, filed on Aug. 24, 2022.

(30) Foreign Application Priority Data

Aug. 17, 2022    (CN) .......................... 202210986346.8

(51) Int. Cl.
*G02B 1/00*    (2006.01)
(52) U.S. Cl.
CPC .................................... *G02B 1/002* (2013.01)
(58) Field of Classification Search
CPC .......... G02B 1/002; G02B 1/00; G02B 1/005; G02B 1/02; G02B 1/04

USPC ......................................................... 359/237
See application file for complete search history.

(56) References Cited

U.S. PATENT DOCUMENTS

| | | | |
|---|---|---|---|
| 8,835,592 B2 * | 9/2014 | Rukavina | C08G 18/28 528/65 |
| 8,865,853 B2 * | 10/2014 | Rukaivina | C09D 175/04 428/425.8 |
| 2002/0017828 A1 | 2/2002 | Roesler | |
| 2012/0110820 A1 * | 5/2012 | Mu | G02F 1/3501 29/428 |

(Continued)

OTHER PUBLICATIONS

Langasite Family Midinfrared Nonlinear Optical OxideMaterials: Structure, Property, and Applications (Year: 2017).*

*Primary Examiner* — William R Alexander
(74) *Attorney, Agent, or Firm* — Hemisphere Law, PLLC; Zhigang Ma

(57) ABSTRACT

An effective nonlinear optical coefficient optimization method for langasite group solid solution crystals is disclosed. The langasite group crystal $A_3BC_3D_2O_{14}$ mainly includes langanite (LGN) crystal, langatate (LGT) crystal and langasite (LGS) crystal. The solid solution crystals are formed by adjusting a component proportion of langasite group crystals with the same structure, so that different ions mix and occupy sites in a polyhedral group, and a polyhedral lattice structure, distortion degree, refractive index and refractive dispersion of the solid solution crystal are changed. The reduction of the phase matching angle and the improvement of the nonlinear optical coefficient are realized, and the effective nonlinear optical coefficient is finally optimized.

2 Claims, 5 Drawing Sheets

(56) References Cited

U.S. PATENT DOCUMENTS

| | | | |
|---|---|---|---|
| 2013/0095311 A1* | 4/2013 | Rukavina | C08G 18/3872 |
| | | | 428/221 |
| 2013/0095714 A1* | 4/2013 | Rukavina | C08G 18/10 |
| | | | 525/453 |
| 2013/0240776 A1 | 9/2013 | Onodera et al. | |
| 2016/0173058 A1 | 6/2016 | Patel et al. | |
| 2024/0353732 A1* | 10/2024 | Zaouter | G02F 1/3507 |

* cited by examiner

EFFECTIVE NONLINEAR OPTICAL COEFFICIENT OPTIMIZATION METHOD FOR LANGASITE GROUP SOLID SOLUTION CRYSTALS

CROSS REFERENCE TO RELATED APPLICATION

This patent application is a continuation application of PCT/CN2022/114468, filed on Aug. 24, 2022, which claims the benefit and priority of Chinese Patent Application No. 202210959521.4, filed on Aug. 21, 2022, the disclosure of which is incorporated by reference herein in its entirety as part of the present application.

TECHNICAL FIELD

The present disclosure relates to the technical field of nonlinear optical crystals and laser technology, and more specifically, to an effective nonlinear optical coefficient optimization method for langasite group solid solution crystals.

BACKGROUND ART

Langasite group crystals (the general structural formula is $A_3BC_3D_2O_{14}$, including four polyhedral groups of $AO_8$, $BO_6$, $CO_4$ and $DO_4$) mainly include langanite (LGN) crystals, langatate (LGT) crystals and langasite (LGS) crystals. Previous studies show that the LGN crystals in this group has the characteristics of wide transmission range and high laser damage threshold. It is a medium infrared nonlinear optical material with excellent comprehensive performance, and has realized the effective output of femtosecond and nanosecond differential frequency medium infrared laser. In the process of nonlinear frequency conversion, the effective nonlinear coefficient of nonlinear crystal material determines its conversion efficiency. The effective nonlinear coefficient depends on the nonlinear coefficient of the material and the refractive index dispersion equation. The phase matching condition of the existing langasite crystals determines that the effective nonlinear coefficient of the infrared frequency conversion in these crystals is small, which limits the frequency conversion efficiency.

Therefore, based on the langasite group solid solution crystals, it is an urgent problem for those skilled in the art to improve the effective nonlinear optical coefficient while maintaining the excellent performance of the group of crystals.

SUMMARY

In view of the above, the present disclosure provides an effective nonlinear optical coefficient optimization method for langasite group solid solution crystals. The composition ratio of langasite group crystals with the same structure are adjusted to form solid solution crystals, and different ions mix and occupy sites on the B-site group and D-site group. The polyhedral lattice structure and distortion degree of the crystals are adjusted, and the refractive index and refractive index dispersion of the solid solution crystals are adjusted. Thus, the phase matching angle is reduced and the nonlinear optical coefficient is improved, and the effective nonlinear optical coefficient is finally optimized.

In order to achieve the above object, the present disclosure adopts the following technical scheme.

An effective nonlinear optical coefficient optimization method for langasite group solid solution crystals is provided. The langasite group crystal $A_3BC_3D_2O_{14}$ mainly includes langanite (LGN) crystal, langatate (LGT) crystal and langasite (LGS) crystal. The solid solution crystals are formed by adjusting a component proportion of langasite group crystals with the same structure, so that different ions mix and occupy sites in a polyhedral group, and a polyhedral lattice structure, distortion degree, refractive index and refractive dispersion of the solid solution crystal are changed.

Preferably, the langanite crystals, langatate crystals or langasite crystals with the same crystal structure and similar composition are mutually dissolved in different proportions to form solid solution crystals, so that the B-site and/or D-site structure of langasite group crystals is changed.

Preferably, the B-site group is mixed with and occupied by $Ga^{3+}$, $Nb^{5+}$, $Ta^{5+}$, $Ti^{4+}$, $Zr^{4+}$, $Hf^{4+}$, $Sn^{4+}$, and $Sb^{5+}$ ions to adjust the refractive index. The electron cloud structures of different ions are different, and the refractive index and refractive index dispersion are adjusted to reduce the phase matching angle and increase the effective nonlinear optical coefficient. Langanite (LGN) crystal and langatate (LGT) crystal with the same crystal structure and similar composition are mutually dissolved in different proportions to form lanthanum gallium niobate tantalate (LGNT) solid solution crystal. The B-site group adopts three ions of Gallium ion ($GA^{3+}$), niobium ion ($Nb^{5+}$) and tantalum ion ($Ta^{5+}$) to occupy and control the distortion of the B-site polyhedral group. Specifically, the crystals are lanthanum gallium niobate tantalate (LGNT) solid solution crystals. The composition ratio of langasite group crystals is 0.9:0.1 or 0.7:0.3, and the specific molar ratio of four raw materials $La_2O_3$, $Ga_2O_3$, $Nb_2O_3$ and $Ta_2O_5$ is 0.3:0.55:0.045:0.005 or 0.3:0.55:0.035:0.015. This series of solid solution crystals maintain the crystal structures of LGN and LGT, and can continuously adjust the refractive index of this group of crystals, thereby changing the phase matching angle and increasing the effective nonlinear optical coefficient.

Preferably, the D-site group is mixed with and occupied by $Ga^{3+}$, $Ge^{4+}$, $Si^{4+}$ ions to adjust the distortion of polyhedron at D-site. At the same time, the electron cloud structures of different ions are different, and the refractive index and refractive index dispersion can be adjusted, so that the phase matching angle is reduced and the effective nonlinear optical coefficient is increased.

Preferably, different ions mix and occupy sites in two types of polyhedral groups of B-site and D-site. $Ga^{3+}$ and $Zr^{4+}$ ions mix and occupy sites at the B-site, and $Ga^{3+}$ and $Si^{4+}$ ions mix and occupy sites at the D-site to form lanthanum gallium zirconate solid solution crystals. At the same time, the polyhedron distortion at B-sit and D-site is controlled to increase the nonlinear optical coefficient, and the crystal refractive index and refractive index dispersion are controlled to reduce the phase matching angle and increase the effective nonlinear optical coefficient.

According to the above technical scheme, compared with the prior art, the present disclosure provides an effective nonlinear optical coefficient optimization method of langasite group solid solution crystals. The solid solution crystals are formed by adjusting the component proportion of langasite group crystals with the same structure, and different ions mix and occupy sites in the B-site group and the D-site group to adjust the polyhedral lattice structure and distortion degree of the crystals, and adjust the refractive index and refractive index dispersion of the solid solution crystals, so as to reduce the phase matching angle and improve the nonlinear optical coefficient, and finally optimize the effective nonlinear optical coefficient.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following description are only embodiments of the present disclosure. For those of ordinary skill in the art, other drawings can be obtained based on the drawings disclosed without creative work.

DETAILED DESCRIPTION OF THE EMBODIMENTS

Figure 1:
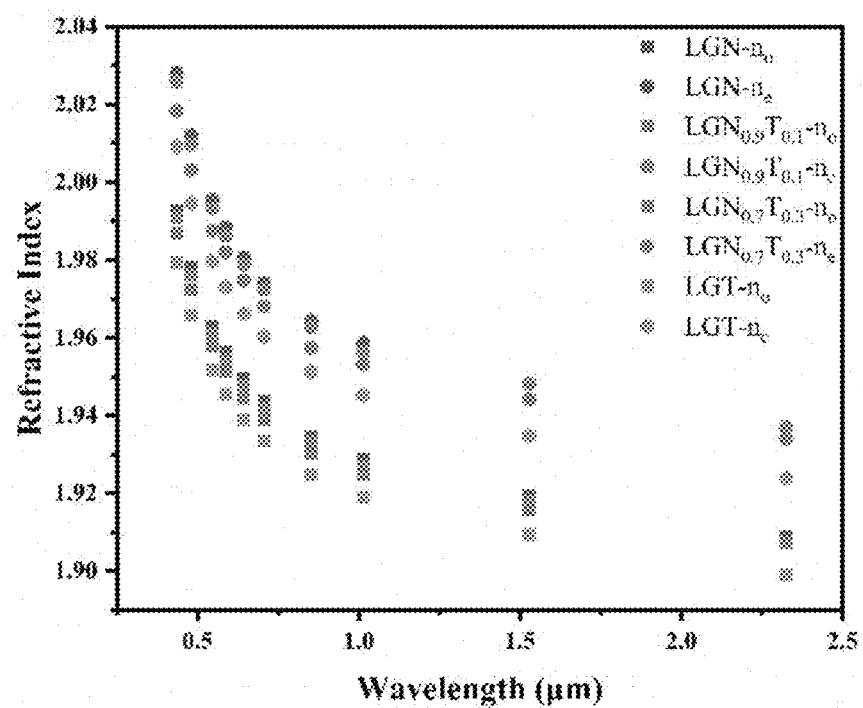
FIG. 1 is a diagram showing the refractive index comparison of the solid solution crystals of LGNT with $Nb^{5+}/Ta^{5+}$ ratios of 0.9:0.1 and 0.7:0.3, and the crystals of LGN and LGT provided in embodiment 2 of the present disclosure.
Figure 2:
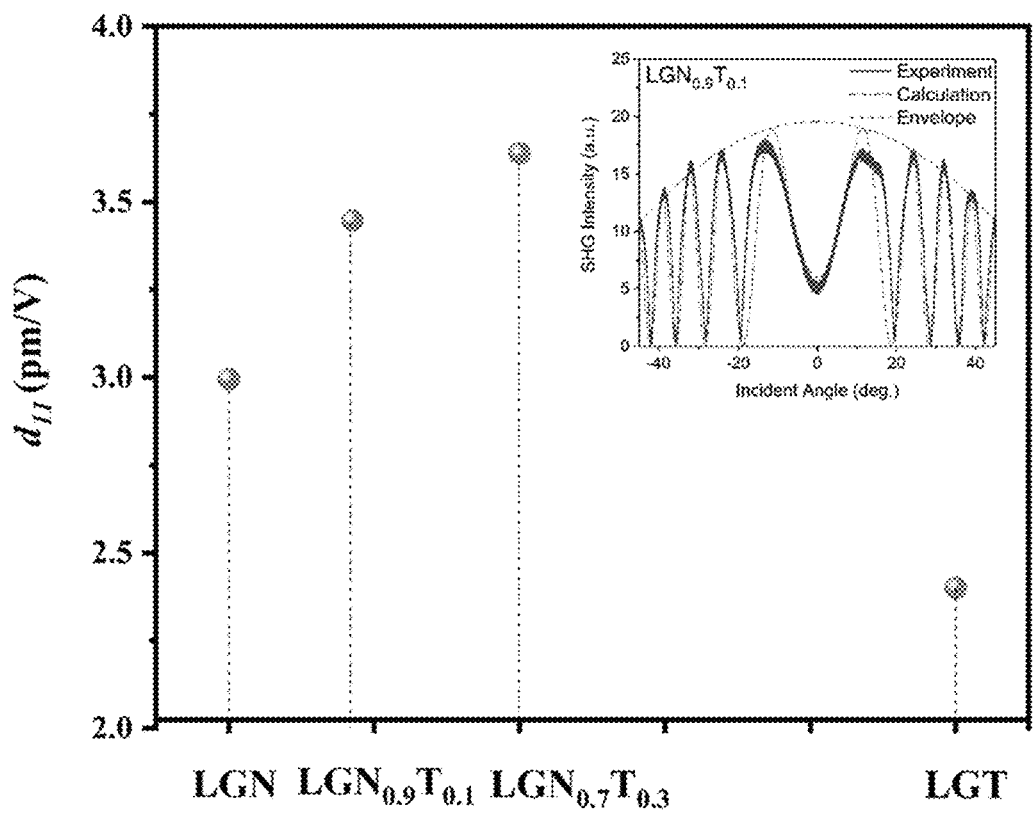
FIG. 2 shows the comparison of the nonlinear optical coefficient of the solid solution crystals of LGNT with $Nb^{5+}/Ta^{5+}$ ratios of 0.9-0.1 and 0.7.0.3 provided in embodiment 2 of the present disclosure.
Figure 3:
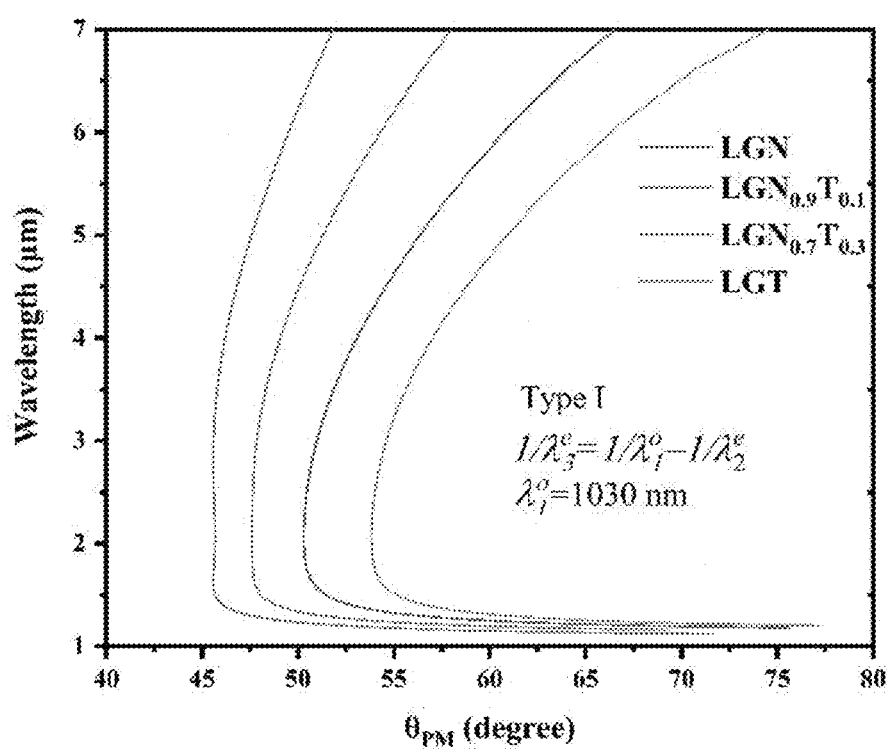
FIG. 3 is a diagram showing the comparison of type I phase matching tuning curves of LGNT solid solution crystals with $Nb^{5+}/Ta^{5+}$ ratios of 0.9:0.1 and 0.7:0.3, and LGN crystals and LGT crystals provided in embodiment 2 of the present disclosure.
Figure 4:
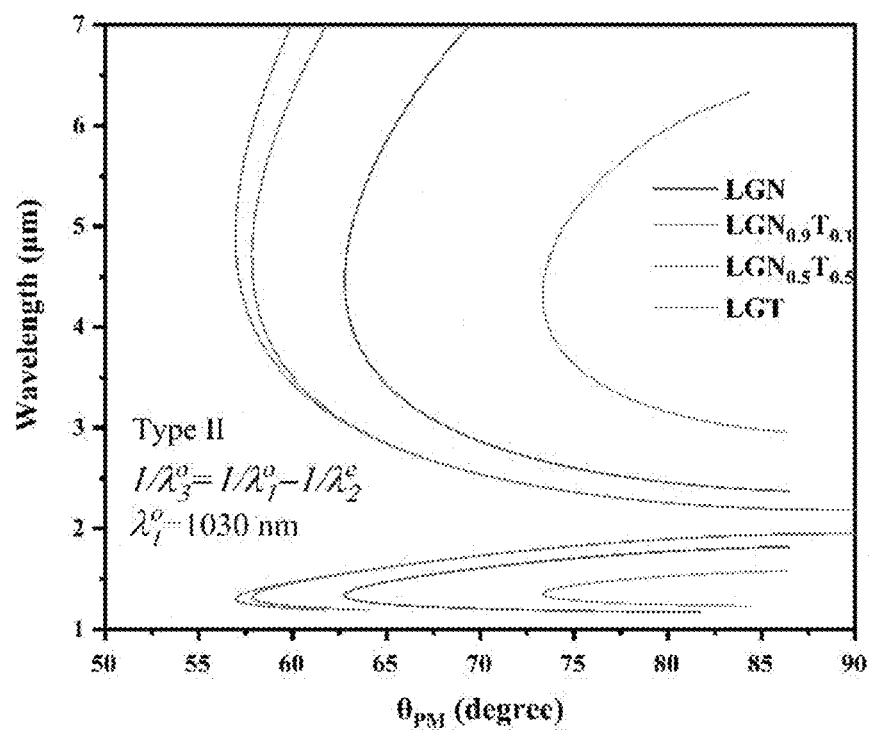
FIG. 4 is a diagram showing the comparison of type II phase matching tuning curves of LGNT solid solution crystals with $Nb^{5+}/Ta^{5+}$ ratios of 0.9:0.1 and 0.7:0.3, and LGN crystals and LGT crystals provided in embodiment 2 of the present disclosure.
Figure 5:
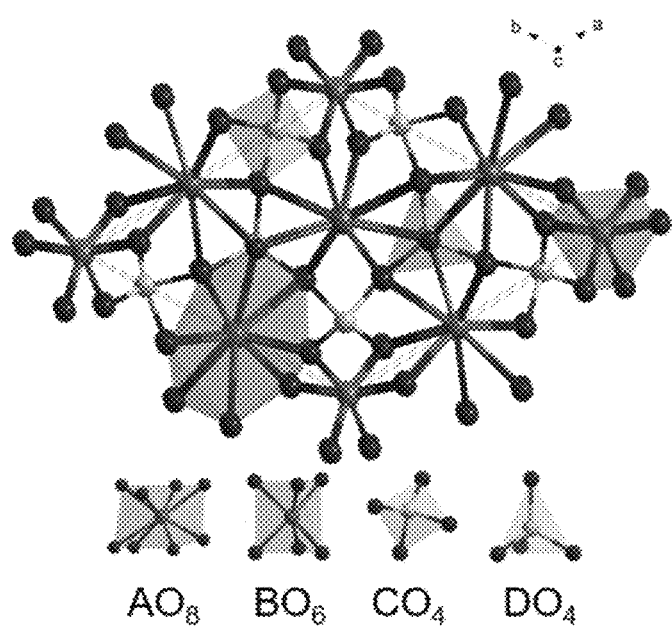
FIG. 5 is a structural diagram of the langasite group crystal $A_3BC_3D_2O_{14}$ provided by the present disclosure.

Technical solutions of the embodiments of the present disclosure will be clearly and completely described below with reference to the attached drawings. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

The embodiments of the present disclosure provide an effective nonlinear optical coefficient optimization method for langasite group solid solution crystals. The gallium silicate lanthanide crystal $A_3BC_3D_2O_{14}$ mainly includes langanite (LGN) crystal, langatate (LGT) crystal and langasite (LGS) crystal. The solid solution crystals are formed by adjusting a component proportion of langasite group crystals with the same structure, so that different ions mix and occupy sites in a polyhedral group, and a polyhedral lattice structure, distortion degree, refractive index and refractive dispersion of the solid solution crystal are changed.

In order to further optimize the above technical scheme, the langanite crystals, langatate crystals or langasite crystals with the same crystal structure and similar composition are mutually dissolved in different proportions to form solid solution crystals, so that the B-site and/or D-site structure of langasite group crystals is changed.

In order to further optimize the above technical scheme, the B-site group is mixed with and occupied by $Ga^{3+}$, $Nb^{5+}$, $Ta^{5+}$, $Ti^{4+}$, $Zr^{4+}$, $Hf^{4+}$, $Sn^{4+}$, and $Sb^{5+}$ ions.

In order to further optimize the above technical scheme, the D-site group is mixed with and occupied by $Ga^{3+}$, $Ge^{4+}$, $Si^{4+}$ ions.

In order to further optimize the above technical scheme, different ions mix and occupy sites in two types of polyhedral groups of B-site and D-site. $Ga^{3+}$ and $Zr^{4+}$ ions mix and occupy sites at the B-site, and $Ga^{3+}$ and $Si^{4+}$ ions mix and occupy sites at the D-site to form lanthanum gallium zirconate solid solution crystals.

The provided nonlinear optical are the lanthanum gallium niobate tantalate solid solution crystals of langasite group, with the chemical formula of $La_3Ga_{5.5}(Nb_{1-x}Ta_x)_{0.5}O_{14}$, belonging to the trigonal crystal system, 32 point group. There are type I (the polarization mode of the two incident beams is the same, and both are e light) and type I (the polarization directions of the two incident beams are different, one is o light and the other is e light) of phase matching. The corresponding effective second-order nonlinear coefficient is $d_{eff}=d_{11} \cos^2\theta \sin 3\varphi$ (type I phase matching) and $d^{eff}=d_{11} \cos \theta \, \varphi$ (type II phase matching). $\theta$ is the phase matching angle, and $\varphi$ is the azimuth angle. The B-site group accommodates many ions such as $Ga^{3+}$, $Nb^{5+}$, $Ta^{5+}$, $Ti^{4+}$, $Zr^{4+}$, $Hf^{4+}$, $Sn^{4+}$, $Sb^{5+}$, etc. The distortion degree of the B-site group can be increased and the nonlinear optical coefficient can be increased by different ion mixing and occupying modes. At the same time, the electron cloud structures of different ions have some differences, and the refractive index and refractive index dispersion of the crystals can be adjusted, the phase matching angle can be reduced, and then the effective nonlinear optical coefficient can be increased. In addition, many ions such as $Ga^{3+}$, $Nb^{5+}$, $Ta^{5+}$, $Ti^{4+}$, $Zr^{4+}$, $Hf^{4+}$, $Sn^{4+}$ and $Sb^{5+}$ have similar ion radii, and have good lattice matching degree, which can form infinite solid solution crystals and easily obtain large-size single crystals with high optical quality. At the same time, the D-site group can also accommodate a variety of ions, such as $Ga^{3+}$, $Ge^{4+}$, $Si^{4+}$.

Embodiment 1: Taking the LGNT solid solution crystals formed by LGN crystals and LGT crystals as an example, the LGNT solid solution crystals with $Nb^{5+}/Ta^{5+}$ ratio of 0.5:0.5 are designed. The specific molar ratio of the four raw materials, $La_2O_3$, $Ga_2O_3$, $Nb_2O_5$ and $Ta_2O_5$, is 0.3:0.55:0.025:0.025. The crystals belong to the trigonal crystal system, 32 point group. With the change of $Nb^{5+}/Ta^{5+}$ component ratio, the distortion of B-site group increases, which is conducive to increase the nonlinear optical coefficient. At the same time, the refractive index and refractive index dispersion of the crystals change, which can reduce the phase matching angle and is beneficial to increase the effective nonlinear optical coefficient of the crystals.

Embodiment 2: The following LGNT solid solution crystals with different $Nb^{5+}/Ta^{5+}$ ratios are designed. For example, the specific molar ratio of the four raw materials, $La_2O_3$, $Ga_2O_3$, $Nb_2O_5$ and $Ta_2O_5$, of the LGNT solid solution crystals with different $Nb^{5+}/Ta^{5+}$ ratios of 0.9:0.1, 0.7:0.3, 0.3:0.7, 0.1:0.9, etc. can be 0.3:0.55:0.045:0.005, 0.3:0.55:0.035:0.015, 0.3:0.55:0.015:0.035, 0.3:0.55:0.005:0.045. This series of solid solution crystals also maintain the crystal structures of LGN and LGT, and the refractive index of this group of crystals can be continuously adjusted, so that the phase matching angle can be changed and the effective nonlinear optical coefficient can be increased.

Embodiment 3: Taking the LZGS solid solution crystals formed by LGZr and LGS as an example, the $La_3Zr_{0.5}Ga_5Si_{0.5}O_{14}$ solid solution crystals with $Zr^{4+}/Si^{4+}$ ratio of 0.5:0.5 are designed. The specific molar ratio of the four raw materials, $La_2O_3$, $Ga_2O_3$, $ZrO_2$ and $SiO_2$, is 0.3:

0.5:0.1:0.1. The crystals belong to the trigonal crystal system, 32 point group. The B-site and the D-site are respectively occupied by $Ga^{3+}/Zr^{4+}$ and $Ga^{3+}/Si^{4+}$ ions, so that the degree of distortion of the B-site group and the D-site group is increased, which is beneficial to increasing the nonlinear optical coefficient. At the same time, the refractive index and the refractive index dispersion of the crystals change accordingly, which can reduce the phase matching angle, and is beneficial to increase the effective nonlinear optical coefficient of the crystals.

Embodiment 4: Taking the LZGS solid solution crystals formed by LGZr and LGS as an example, the LZGS solid solution crystals with different $Zr^{4+}/Si^{4+}$ ratios are designed. For example, the specific molar ratio of the four raw materials, $La_2O_3$, $Ga_2O_3$, $ZrO_2$ and $SiO_2$, of the solid solution crystals with different $Zr^{4+}/Si^{4+}$ ratios of 0.9:0.1, 0.7:0.3, 0.3-0.7, 0.1:0.9, etc. can be 0.3:0.5:0.18:0.02, 0.3:0.5:0.14:0.06, 0.3:0.5:0.06:0.14, 0.3:0.5:0.02:0.18. The crystals belong to the trigonal crystal system, 32 point group. The B-site and the D-site are respectively jointly occupied by $Ga^{3+}/Zr^{4+}$ and $Ga^{3+}/Si^{4+}$ ions, so that the degree of distortion of the B-site group and the D-site group is increased, which is beneficial to increasing the nonlinear optical coefficient. At the same time, adjusting the refractive index and refractive index dispersion of the crystals can reduce the phase matching angle and increase the effective nonlinear optical coefficient of the crystals.

Various embodiments in the present specification are described in a progressive manner, and the emphasizing description of each embodiment is different from the other embodiments. The same and similar parts of various embodiments can be referred to for each other. For the apparatus disclosed in the embodiments, since the apparatus corresponds to the method disclosed in the embodiments, the description is simplified, and reference may be made to the method part for description.

The above description of the disclosed embodiments enables those skilled in the art to realize or use the present disclosure. Many modifications to these embodiments will be apparent to those skilled in the art. The general principle defined herein can be realized in other embodiments without departing from the spirit or scope of the present disclosure. Therefore, the present disclosure will not be limited to these embodiments shown herein, but will conform to the widest scope consistent with the principle and novel features disclosed herein.

What is claimed is:

1. An effective nonlinear optical coefficient optimization method for langasite group solid solution crystals, wherein the langasite group crystal $A_3BC_3D_2O_{14}$ mainly comprises langanite (LGN) crystal, langatate (LGT) crystal and langasite (LGS) crystal; the solid solution crystals are formed by adjusting a component proportion of langasite group crystals with the same structure, so that different ions mix and occupy sites in a polyhedral group, and a polyhedral lattice structure, distortion degree, refractive index and refractive dispersion of the solid solution crystal are changed, wherein the B-site group is mixed with and occupied by $Ga^{3+}$, $Nb^{5+}$, $Ta^{5+}$, $Ti^{4+}$, $Zr^{4+}$, $Hf^{4+}$, $Sn^{4+}$, and $Sb^{5+}$ ions; the D-site group is mixed with and occupied by $Ga^{3+}$, $Ge^{4+}$, $Si^{4+}$ ions; or different ions mix and occupy sites in two types of polyhedral groups of B-site and D-site at same time; $Ga^{3+}$ and $Zr^{4+}$ ions mix and occupy sites at the B-site, and $Ga^{3+}$ and $Si^{4+}$ ions mix and occupy sites at the D-site to form lanthanum gallium zirconate solid solution crystals.

2. The effective nonlinear optical coefficient optimization method for langasite group solid solution crystals of claim 1, wherein the langanite crystals, langatate crystals or langasite crystals with the same crystal structure and similar composition are mutually dissolved in different proportions to form solid solution crystals, so that the B-site and/or D-site structure of langasite group crystals is changed.

* * * * *